March 13, 1934.　　　　C. W. VOGT　　　　1,950,643
WRAPPED ICE CREAM PORTION
Filed Sept. 21, 1931
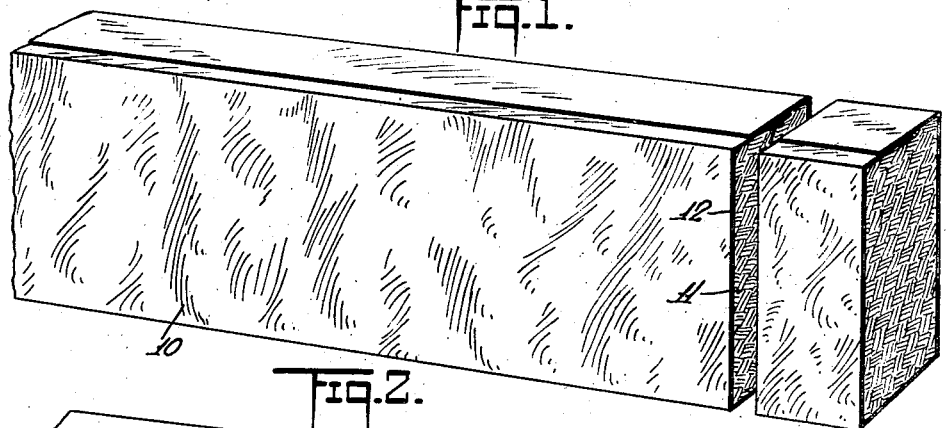
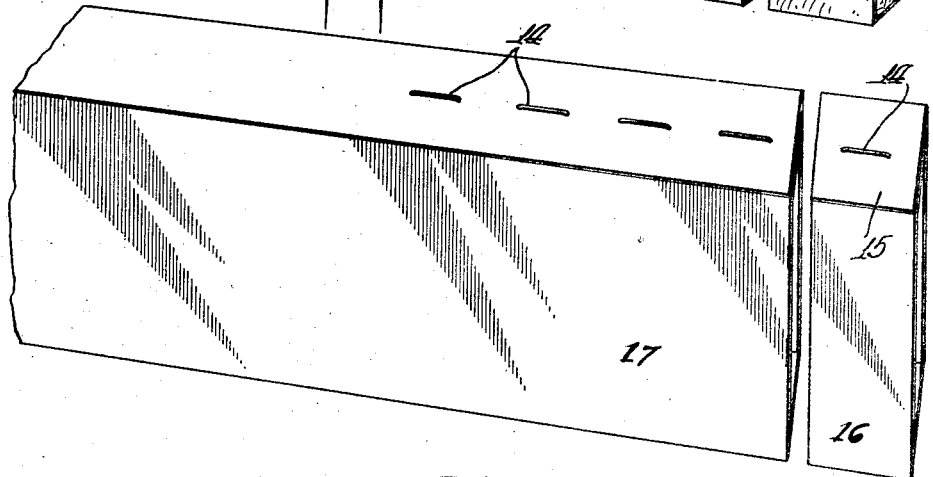
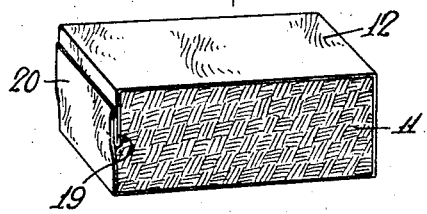
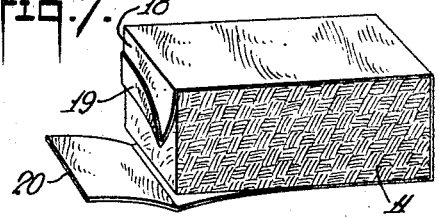
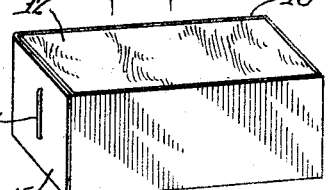
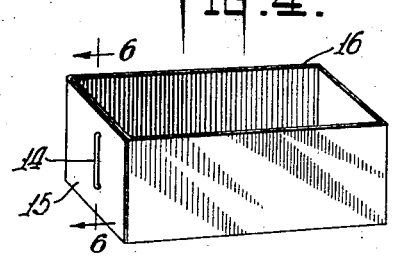
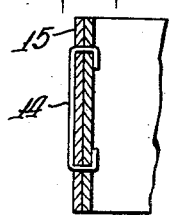
INVENTOR
*Clarence W. Vogt.*
BY
*Dean Fairbank Hirsch & Foster*
ATTORNEYS Patented Mar. 13, 1934

1,950,643

UNITED STATES PATENT OFFICE 1,950,643

WRAPPED ICE CREAM PORTION

Clarence W. Vogt, Louisville, Ky., assignor to Vogt Instant Freezers, Incorporated, Louisville, Ky., a corporation of Delaware Application September 21, 1931, Serial No. 564,132

3 Claims. (Cl. 206—56)

This invention relates to packaged frozen comestibles, and although applicable to many kinds of food products or ingredients thereof, it is particularly applicable to comestibles which are liquid at body temperature, and which may be readily solidified or rendered comparatively hard by the action of refrigeration.

As an example of such a comestible, I may mention ice cream, water ice, sherbet, and the like. Under the term comestibles, I include not only those food products which are normally served in solid state, but also those which may be melted and served in liquid state primarily as a drink, such for instance as orange juice.

As one important feature of my invention, I produce individual portions of the comestible, which are individually wrapped in an inexpensive and effective manner, and which may be easily and quickly unwrapped at the time the comestible is served.

As another important feature of the invention, the wrapping of the package is so designed and so formed that it may be made in a very inexpensive manner, but with sufficient rigidity to permit the individual packages to be piled up, and the weight of the pile sustained by the lower packages, even though, due to the temperature change, the comestible in the lower packages may have materially softened.

Other objects and advantages will be pointed out hereinafter, or will be apparent from a consideration of the accompanying drawing and the following description.

In the accompanying drawing, I have illustrated certain of the parts which may be employed, and indicated somewhat diagrammatically the steps which may be performed.

Fig. 1 is a perspective view showing a continuous bar of the comestible with one individual portion cut therefrom.

Fig. 2 is a perspective view of a part of a continuous wrapper or casing with one section cut therefrom.

Fig. 3 is a perspective view of the partially wrapped individual portion shown at the right of Fig. 1.

Fig. 4 is a perspective view of a part of the casing in position to receive the portion shown in Fig. 3.

Fig. 5 is a perspective view of the complete article of manufacture.

Fig. 6 is a section taken on the line 6—6 of Fig. 4, and

Fig. 7 is a perspective view of the comestible after removal from one section of the casing or wrapping, and having the other section partly removed.

In carrying out my invention, I preferably continuously form a bar of comestible of such cross-sectional area that a section may be cut from the end thereof to form an individual portion. Such a continuous bar may be formed with its tubular wrapper, by means of the apparatus and process disclosed and broadly claimed in my prior Patents 1,810,740, 1,810,863, or 1,810,864, issued June 16, 1931, or the material may be frozen in flake form and enwrapped as disclosed and claimed in my prior Patent 1,810,862 issued on the same date.

In Fig. 1, I have shown one end of a continuous bar 10 comprising a body of the comestible 11 and a tubular wrapper 12. Merely as an example, this bar may have cross-sectional dimensions of 1¼" by 3", so that by cutting off sections from the end 1¼ inches long measured in the direction of the length of the bar, each section would be approximately 1¼ by 1¼ by 3 inches, and would comprise approximately 1/6th of a pint.

Any suitable mechanism may be employed for cutting the bar into sections during its continuous formation and advance, one form of such cutting mechanism being shown in certain of my prior patents above referred to. So far as concerns certain features of my present invention, the bars of any desired length may be hardened while at rest in a hardening room, and later cut into the shorter sections.

When the individual portion is cut from the end of the bar, it will be noted that it has a partial wrapping which extends around four sides of the body of prismatic form, and that two sides are exposed. This wrapping for the bar and for the four sides of the severed portion is preferably of comparatively thin transparent water-proof sheet material, as for instance a cellulose acetate sheet material commonly known as "macolite".

In addition to this partial wrapper of very thin sheet material, there is provided a second wrapper portion or partial casing of comparatively stiff material. This likewise covers only four of the six sides of the portion, but covers the two sides which are exposed by the cutting of the comestible, and the first mentioned wrapper. Thus, there is a double wrapping or covering on the ends. This second or stiff wrapper may be formed in any suitable manner but advantageously by cutting sections from a continuous strip of sheet material creased, folded and secured at its overlapped edges to form a flattened tube.

In Fig. 2 I have shown a flattened tube 17 of comparatively stiff material, as for instance, waxed or water-proofed cardboard which has overlapping edge portions secured together by wire staples or fasteners 14. The overlapping of the edges of the sheet is such as to form an end wall 15 of double thickness when a section is cut from the end of the flattened tube and expanded to form a comparatively stiff wrapper 16, as shown in Fig. 4. This stiffness should be such that the wrapper set edgewise will be sufficient to sustain at least ten times the weight of the portion without substantial bending, even though the portion be somewhat softened.

The individual portion 11 of the comestible with its wrapping 12 and the stiff wrapper or casing 16, are so proportioned that the former will have a comparatively snug fit in the latter, and the side walls of the outer casing will protect the exposed surface of the comestible. The individual units may be thus made up, as shown in Fig. 5, at the factory and delivered to the purchaser at a soda fountain or other place of sale or use, or may be assembled by the retailer or manufacturer to make up larger packages of a pint, quart or other size by selecting the flavor desired. In doing so, he may take individual portions of as many different flavors or qualities as may be desired or available.

When the comestible is presented for consummation, the wrapping is removed, and as one feature of my invention, this wrapping is so formed that the removal may be easily accomplished. The individual portion with the wrapper 12 may be readily slid sidewise out of the outer casing 16, and the wrapping 12 may be readily stripped off. To facilitate this removal of the inner wrapping, the edges of the sheet around the bar are so folded, that one edge forms an inner ply 18 and an outer ply 19 folded back onto it, and the opposite edge of the sheet forms an outer ply 20 which is slightly narrower than the width of the end of the portion of the comestible. Thus, the free edge of the outer ply or layer 20 is not in contact with the material, and will not be frozen to it, and may be easily lifted so that the consumer, user or dispenser may readily grasp the free end of the wrapping without bringing his fingers in contact with the comestible.

When the outer ply 20 is pulled away as shown in Fig. 7, the exposed end of the ply 19 can be easily picked off as it likewise is not in contact with the comestible, and will not be frozen to the latter. By taking the two ends 19 and 20 between the thumb and finger of each hand, the wrapping may be stripped off the body of the comestible, and the individual portion dropped into a glass or on to a plate without bringing the hands into contact with the comestible.

In forcing the comestible with its inner wrapping out of the outer casing, it will be noted that it is merely necessary to apply pressure on one surface of the inner body, and that this surface is protected by the wrapping 12. If the comestible be frozen to the outer casing, the ends may be readily broken apart at the fastening 14, and the casing stripped off.

Thus, the food product may be shipped, stored and dispensed in a sanitary manner. In dispensing, the customers will receive the same uniform sized portions. Furthermore, the retailer's cash receipts may be checked against his sales, which cannot be done with accuracy when the clerk serves portions of various sizes by lading from bulks in large cans.

As the walls of the outer casing 16 are comparatively stiff, the separate units may be piled up with the open side of the outer casing at the top and bottom, or at the sides as the stiffness is such as to greatly reenforce the unit even though the comestible is somewhat softened by rising temperature.

If transparent material is used for the inner wrapping, the desired flavor may be readily selected, and there would be thus no necessity for printing the flavor on the outside of the package, except in the case of special or ususual flavors such as bisque (which is sometimes difficult to visually distinguish from vanilla), or flavors containing nut ingredients, in which case a paper band may be placed around the individual portion, the band having the particular flavor printed thereon.

With my new and improved form and method of wrapping, the ice cream or similar product may be practically completely removed from the wrapper without the use of instruments such as knives or spoons. This is not the case where the conventional form of wrapper is employed, especially when the ice cream has become somewhat soft.

I have found that the amount of material which usually remains on the wrapper depends on the sharpness of the bend made at the corners where the wrapper is removed from the material. Where this angle is 90° or greater, it is possible to remove the wrapper with a minimum of material adhering thereto. Where the wrapper covers the sides as well as the bottom and top of a material such as ice cream, it is difficult if not impossible to effect a sharp bending of the wrapper at all points as it is being withdrawn.

With my new wrapper, it will be seen that this bending may be much more readily effected as the stripping takes place in a straight line across the sides and ends of the article. It is highly desirable that the complete stripping of the wrapper be effected without the use of utensils, both from the standpoint of time required as well as from the sanitary standpoint.

The article as shown in Fig. 3 with the ends of the ice cream block exposed is not claimed in this application except in connection with the outer casing which covers said ends.

Having thus described my invention, what I claim as new and desire to secure by Letters Patent is:—

1. An individual service portion of a frozen comestible of prismatic form, having a wrapping strip of thin flexible sheet material extending around four sides with the end portions overlapped upon one side of said service portion and readily separable from each other, and a stiff tubular casing extending around four sides including two only of said first mentioned sides of said service portion and of sufficient strength to effectively resist crushing when a plurality of similar individual portions are stacked thereon, whereby said comestible may be served by slipping it and said wrapping strip out of said casing and unpeeling said wrapping strip by gripping the end portions thereof and pulling in opposite directions.

2. The process of forming individual wrapped service portions of a frozen comestible, which includes forming a bar of the comestible rectangular in cross-section with a tubular wrapper formed of a strip of wrapping material with overlapping, readily separable, edge portions, cutting the bar and wrapper transversely into sections and inserting the sections into comparatively stiff tubular casings rectangular in cross-section to cover the two surfaces of the comestible exposed by said cutting, whereby said service portions are entirely encased and may be dispensed in an entirely sanitary manner by slipping the comestible and wrapper out of said casing and unpeeling said wrapping strip from said comestible.

3. An individual service portion of a frozen comestible of prismatic form, having a wrapping strip of thin flexible sheet material extending around four sides with the end portions forming juxtaposed readily graspable tabs out of contact with the comestible, and a stiff tubular casing extending around four sides including two only of said first mentioned sides of said service portion and of sufficient strength to effectively resist crushing when a plurality of similar individual portions are stacked thereon, whereby said comestible may be served by slipping it and said wrapping strip out of said casing and unpeeling said wrapping strip by gripping the end portions thereof and pulling in opposite directions.

CLARENCE W. VOGT.